Aug. 5, 1969 J. E. EICHENLAUB 3,459,908
DEFORMATION RESPONSIVE INDICATING PANEL
Filed Oct. 12, 1966 3 Sheets-Sheet 1
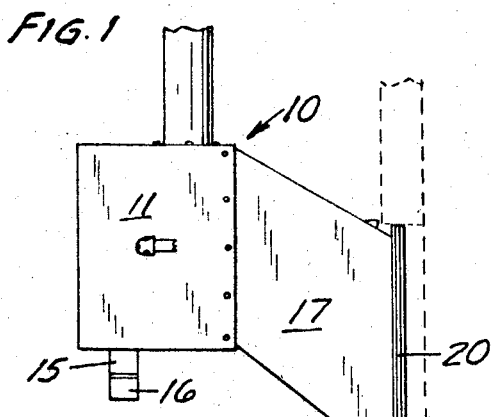
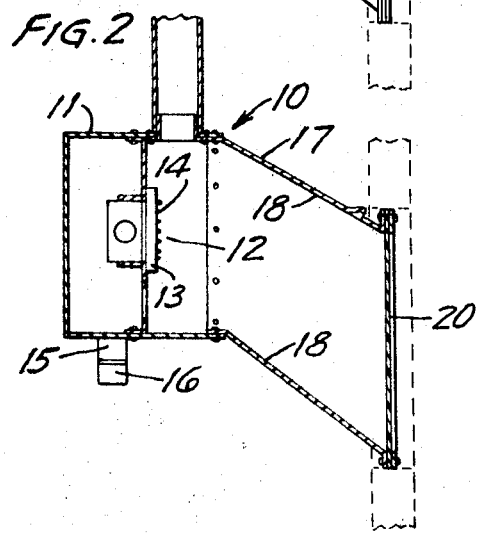
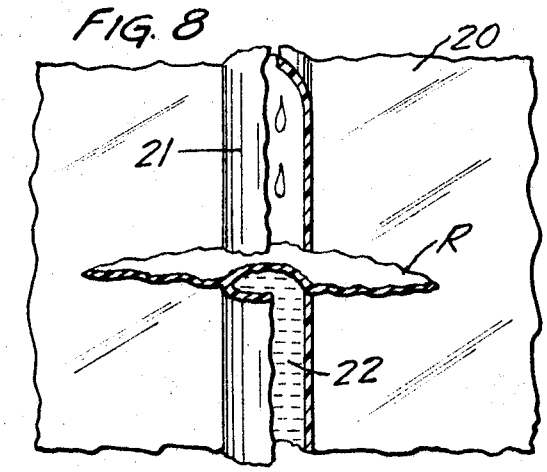
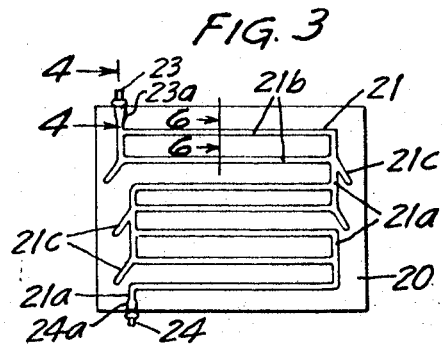
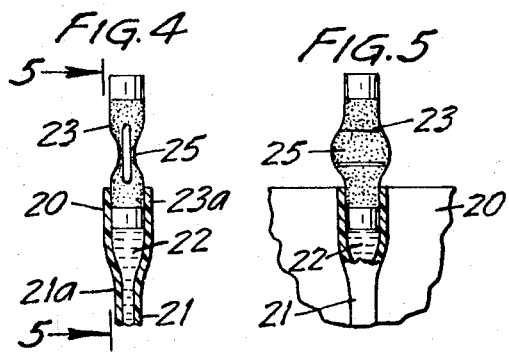
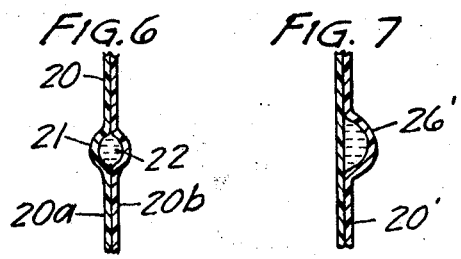
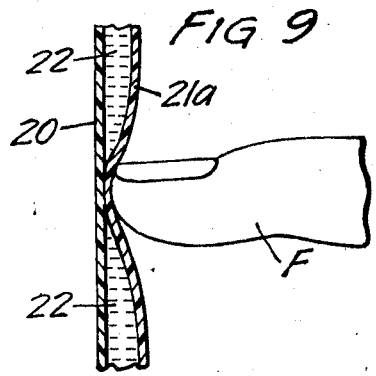
INVENTOR.
JOHN E. EICHENLAUB
BY
Williamson, Palmatier & Bains
ATTORNEYS Aug. 5, 1969

J. E. EICHENLAUB 3,459,908

DEFORMATION RESPONSIVE INDICATING PANEL

Filed Oct. 12, 1966

INVENTOR.
JOHN E. EICHENLAUB
BY
Williamson, Palmatier & Bains
ATTORNEYS 4,459,908
Patented Aug. 5, 1969

3,459,908
DEFORMATION RESPONSIVE INDICATING PANEL
John E. Eichenlaub, 9321 Franklin Ave. W.,
Minneapolis, Minn. 55426
Filed Oct. 12, 1966, Ser. No. 586,174
Int. Cl. H01h 35/00, 35/24
U.S. Cl. 200—61.08         9 Claims

ABSTRACT OF THE DISCLOSURE

A panel highly transmissive of radiant heat and infrared for a gas fired radiant heater and including fluid filled veins in the panel to produce an indication of panel rupture.

In many instances, it is desirable to enclose a gas fired radiant heater with a panel through which the radiant energy is transmitted. The enclosing of the heater and the transmission of the heat through the panel is primarily a safety measure, and therefore it is desirable that an indication be produced in the event that a rupture occurs in the panel or in the event that the panel is otherwise materially deformed. Where, as in a gas fired heater, the panel must be highly transmissive of infrared rays, it has been found that a panel of a synthetic film material known commercially as Teflon which is highly transmissive to infrared rays and is strong and pliable, has been successfully used. Other film material such as Aclar are satisfactory also.

In other instances, the panel might also be of a rigid nature. The material deformation of the panel would include a rupture, whether the panel is rigid or pliable, and the material deformation might also include a sagging under influence of substantial heat; and might also include deformation by physical object touching the panel.

In any event, it is very desirable to detect material deformation of the panel in many instances, including the instance of utilizing the panel in a gas fired radiant heater.

An object of my invention is to provide a new and improved panel to produce an indication in response to a material deformation thereof.

Another object of my invention is to provide a novel panel which will withstand the normal influences applied to it, but will produce an indication in response to a material and unusual deformation.

A further object of my invention is to provide a panel producing an indication in response to a rupture or breakage thereof.

A still further object of my invention is to provide a novel panel sensitive to material deformation thereof and also adapted to be employed as an industrial alarm, as a temperature sensitive alarm, and as a burglar alarm.

These and other objects and advantages of my invention will more fully appear from the following description made in connection with the accompanying drawings, wherein like reference characters refer to the same or similar parts throughout the several views, and in which:

FIG. 1 is a side elevation view of gas fired radiant heater to which the present invention is applied.

FIG. 2 is a section view of the heater taken on a substantially vertical plane.

FIG. 3 is an elevation view of a panel adapted for application to the gas fired radiant heater.

FIG. 4 is an enlarged detail section view taken approximately at 4—4 in FIG. 3.

FIG. 5 is an enlarged detail section view taken approximately at 5—5 in FIG. 4.

FIG. 6 is an enlarged detail section view taken approximately at 6—6 in FIG. 3.

FIG. 7 is a view similar to FIG. 6 and illustrating another embodiment of the invention.

FIG. 8 is a greatly enlarged perspective view of a portion of the panel cut away and shown in section for clarity of detail and illustrating a rupture therein.

FIG. 9 is an enlarged detail view illustrating another manner of deformation of the panel.

Figure 10:
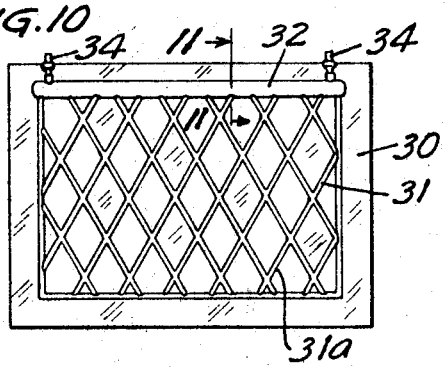
FIG. 10 is an elevation view of another panel embodying the present invention.
Figure 11:
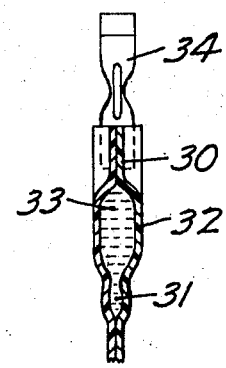
FIG. 11 is an enlarged detail section view taken approximately at 11—11 in FIG. 10.

A gas fired radiant heater 10 is illustrated to have a housing 11 defining a combustion area 12 confining a heat radiator 13 constructed of ceramic or other similar heat resisting material. Gas is supplied into the combustion area and through the radiator to burn in a small flame 14 at the front face of the radiator; and the gas is controlled by a valve 15 operated by an electric solenoid 16. The heater 10, as illustrated, is provided with a diverging duct 17 through which radiant energy, including heat and infrared rays, are transmitted outwardly through a panel 20. The inner surfaces 18 of the duct are polished to be reflective to the radiation being transmitted from the radiator 13 and outwardly through the panel 12.

The panel 20, in the form shown, consists in a pair of sheets or laminae 20a and 20b of film material highly transmissive to infrared rays and as indicated, each of the sheets may be a two mil thickness of Teflon. The confronting faces of the sheets are heat sealed together so that the panel is an integral structure. Small elongate areas of the laminae 20a and 20b remain spaced apart to define veins 21 in the panel. The veins 21 are filled with a fluid 22 under pressure which may be sensed in any of numerous ways. In the form of FIG. 3, the fluid may be a conductor of electricity, such as mercury; it being understood that in the event the panel 20 is ruptured as indicated at R in FIG. 8, the fluid 22 will run out of the veins as by gravity which may readily be detected electrically. Alternatively, the fluid 22 may be a commercial silicone fluid, made by General Electric Company, Schenectady, N.Y., known as SF96, which has very nearly the same characteristics for transmissibility of infrared energy as the Teflon panel. In order that the panel 20 may accommodate rigid metal conductors 23 in conducting relation with the fluid 22, the vein 21 is enlarged as at 23a and 24a near the edge of the panel so as to receive the rigid metal conductor which may be in the form of a short length of copper tubing having a black oxide finish on most of the exterior so as to be readily heat sealable to the film material in the laminae 20a and 20b. The conductor 23 is heat sealed into intimate sealing relation with the panel 20, so as to entirely close the end of the veins 21. The enlarged portions 23a and 24a of the veins adjacent the conductors 23 and 24 provide small reservoirs for the fluid 22. It will be noted that the rigid conductors 23 and 24 are crimped and pinched closed as at 25, so as to confine the fluid 22 in the panel 20. The tubular conductors 23 and 24 have the ends polished as to provide a good electrically conducting relationship with the fluid 22.

The tubular nature of the conductors 23 and 24 is useful in the filling of the veins 21 of the panel. The lowermost rigid conductor 24 is inserted, and then the fluid 22 is supplied into the veins 21 through the conductor 23. After the fluid 22 entirely fills the veins 21, the rigid tubular conductors 23 and 24 are crimped and pinched closed so as to seal the fluid in the panel. It will be noted that certain portions, as at 21a of the veins 21 provide the sole path or connection between the conductors 23 and 24. Other portions 21b of the veins are shunted in relation to each other so as to provide alternate paths for the electrical current between the conductors 23 and 24. Still additional portions 21c of the veins are single ended or dead ended so that there will be no flow of electrical current through these portions. It will be understood however, that rupture of the panel as indicated at R in FIG. 8 of any of these portions 21a 21b and 21c will cause a drainage of the fluid 22 from the veins so as to cause the fluid 22 to withdraw from the conductor 23 and thereby effect a switching action. Likewise in the event that the panel 20 is materially deformed along one of the portions 21a as illustrated in FIG. 9, wherein pressure is being applied against the vein portion by a person's finger or by an object F, the circuit continuity between the conductors 23 and 24 is broken. The effective fluid pressure in the area of the pinched off vein is reduced to zero because of the lack of fluid and the lack of continuity may be regarded as an indication of this material change in fluid pressure at this point.

Likewise, it is certainly possible that the panel 21 may be subjected to substantial heat for some reason to cause substantial sagging thereof and a swelling of the veins in the subject area, whereupon this material deformation will very likely cause a withdrawal of the fluid 22 away from the conductor 23 to effect a switching action or discontinuity in the electrical circuit.

Although it is desirable to make the veins 21 as small as practical in the panel, consideration must be given to the resistivity of the conductor fluid 22. Satisfactory operation has been obtained with the vein of approximately ⅛ inch in diameter.

In FIG. 7, the panel 20' is substantially identical to panel 20, as described, with the exception that a channel 26' is formed in one of the laminae and the other laminae remains flat as the two laminae are heat sealed together. This construction facilitates ease of fabrication or construction.

In many respects the panel 30, illustrated in FIG. 10, is similar to the panel 20. The panel 30 is provided with a plurality of veins 31 which are arranged in a grid work or crisscross arrangement and traverse the area of the panel 30 which is subject to being damaged or materially deformed as by rupturing or sagging. The veins 31 are interconnected at the cross-over areas, and the veins are connected with a vein portion 32 which is somewhat larger in size and may be regarded as a reservoir for the fluid 33 which has such a volume or cross section throughout this enlarged vein portion 32 as to decrease the effective resistance of the conductor fluid 33, which may be mercury, so that the resistance is negligible. This panel 30 has a pair of rigid metal conductors 34, heat sealed into the marginal edge of the panel so that the inner portions of the conductors 34 are in conducting relationship with the fluid 33 as described in connection with FIGS. 4 and 5. In this panel 30, the vein portions 31a which are arranged in a crisscross grid work, may have a substantially decreased size as compared to the vein portion 32, because the vein portions 31a do not carry an appreciable amount of electrical current between the conductors 34. It has been found satisfactory that the crisscross vein portions 31a may be approximately 1/16 inch in diameter, whereas the vein portion 32 is preferably approximately 3/16 of an inch across.

In the event of a rupture of the panel 30 such that the rupture intersects one of the vein portions 31a, the conductor fluid 33 will drain from the panel and will soon produce a circuit discontinuity between the conductors 34. The circuit discontinuity thereby provides an indication of the material deformation of the panel.

The panel 30 is applicable to the gas fired radiant heater 10 in the same fashion as the panel 20. The conductors 34 are connected in series into the control circuit for the electric solenoid 16 of the heater so that when a circuit discontinuity occurs, the valve 15 will close to shut off the gas supply for the heater.

Figure 12:
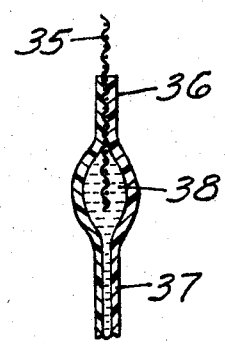
FIG. 12 is an enlarged detail section view similar to FIG. 11, but illustrating a modified form of the invention.

In the modification as illustrated in FIG. 12, a wire screen 35 is heat sealed into the panel 36 which is otherwise constructed in a fashion similar to either panel 30 or panel 20. The panel 36 has vein portions 37 traversing the areas of the panel subject to being damaged or materially deformed so as to produce a circuit discontinuity in the event of a rupture. In construction of the panel 36, the screen 35 is merely laid between the laminae of the panel at the time the laminae are heat sealed together so that the plastic film material flows through and around and in sealing engagement with the screen, the inner portion of which is in intimate conducting relationship with the fluid 38.

Figure 13:
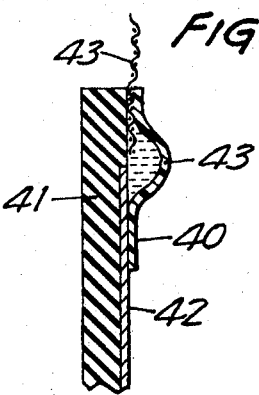
FIG. 13 is a view similar to FIG. 12 and illustrating a still further modification of the invention.

In FIG. 13, it is illustrated that a single laminae of pliable plastic heat sealable film 40 is heat sealed to a rigid board 41 having a printed circuit 42 on the surface thereof. The laminae 40 has a vein-forming channel 43 shaped therein which may merely cover the end of the printed circuit 42 or may have length as to carry current for a substantial distance. The heat sealable film is heat sealed to the board 41 and in and around and in sealing relation with a wire screen 43 so as to facilitate ready and easy electrical connection to the printed circuit 42.

Figure 14:
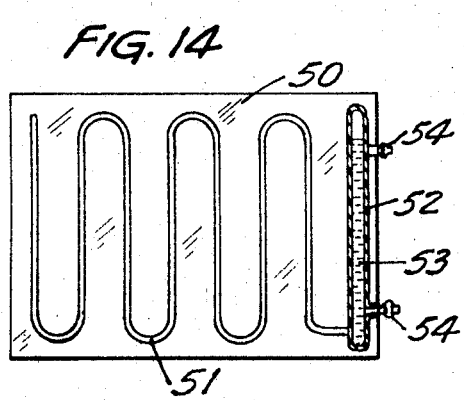
FIG. 14 is an elevation view of another embodiment of the invention.

The panel 50 illustrated in FIG. 14 is similar in construction to the panels 20 and 30 hereinbefore described and has a fluid confining vein 51 formed between the face to face laminae of film which are heat sealed together excepting along the vein 51. The major portion of the vein 51 confines only gas or air under pressure. An enlarged portion 52 of the vein confines a quantity of electrically conductive liquid 53 such as mercury for providing an electrical connection between the rigid metal conductors 54 which are affixed and sealed into the panel 50 in the manner hereinbefore described. The liquid 53 may be disposed along a short length of the vein portion 51, but the air pressure in the vein portion 51 maintains the mercury at the illustrated level in the reservoir vein portion 52. It will be understood that in the event of a rupture in the panel 50, the pressure is relieved in the vein portion 51 so as to permit the level of the mercury 53 in the reservoir portion of the vein 52 to lower and thereby produce a circuit discontinuity between the rigid metal conductors 54.

Figure 15:
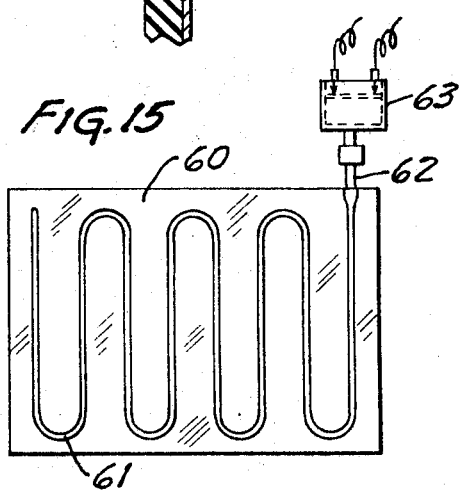
FIG. 15 is an elevation view of a still further modified form of the invention.

The form of the panel 60 in FIG. 15 is similar to the other panels illustrated and includes a vein 61 formed between the confronting faces of film laminae heat sealed together, and in this form of the invention the vein 61 is filled with air or gas under pressure. The vein 61 has a tubular fitting 62 heat sealed into the end of the vein providing air pressure responsive electrical switch 63 responsive to a reduction of the pressure in the vein as to perform an electrical switching function.

The form of invention in FIG. 15, and the panel 64 includes a vein 65 formed between the confronting faces of the film laminae heat sealed together. In this form of the invention the vein 65 contains a fluid such as air or other gas under a reduced pressure, relative to ambient pressure such that the fluid pressure within the vein 65 approaches or approximates a vacuum. A pressure responsive electric switch is connected to the vein 65 in the panel by a tubular fitting 67 so that the switch 66 senses the fluid pressure in the vein. The diaphragm 68 of the switch completes the electric circuit between the contacts so long as reduced pressure is maintained in the vein 65. In the event the panel 64 is ruptured so as to permit air migration into the vein, this deformation of the panel is sensed by the pressure responsive switch which breaks the circuit between the contacts in response to this change of fluid pressure in the vein.

Figure 17:
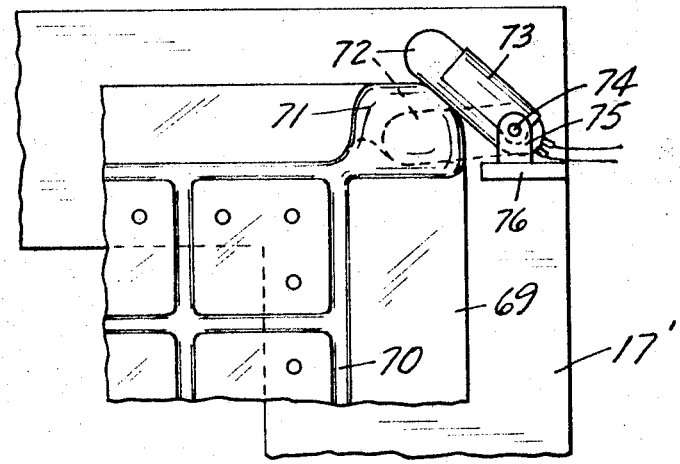
FIG. 17 is an enlarged detail elevation view illustrating still another modified form of the invention.

In the form of the invention illustrated in FIG. 17, the end portion of duct 17' is similar to the duct 17 illustrated in FIGS. 1 and 2 and mounts a panel 69 of infrared transmissible material hereinbefore described which has a grid work of veins 70 formed therein. The panel 69 has a bulb or enlarged vein 71 in fluid communication with the veins 70 so as to be normally bulged or distended under the influence of fluid pressure therewithin. The bulb 71 will thereby normally retain a conventional mercury switch 72 in an inclined position maintaining the electric circuit formed thereby at a preset condition. The mercury switch 72 is carried by a clip 73 supported and pivoted at one end by pins 74 which are supported by ears 75 on a bracket 76 which is affixed to the frame 17'. It will be recognized that the switch 72 which is in fact separate from the panel 69 is controlled thereby such that when the panel is ruptured to allow the fluid in the veins 70 to be released, the pressure in the bulb is reduced causing collapse thereof which permits the weight of the bracket 73 and mercury switch 72 to cause tilting of the switch and thereby effect a change in the state of the circuit.

Figure 18:
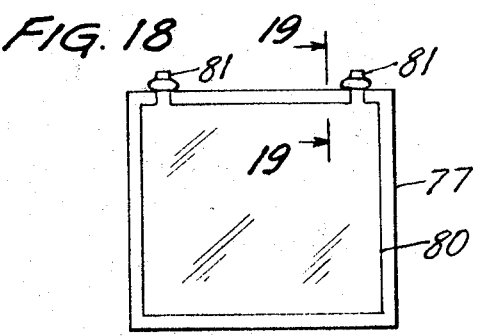
FIG. 18 is an elevation view of an additional modification of the invention.
Figure 19:
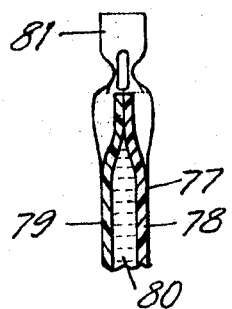
FIG. 19 is a greatly enlarged detail section view taken approximately at 19—19 in FIG. 18.
Figure 16:
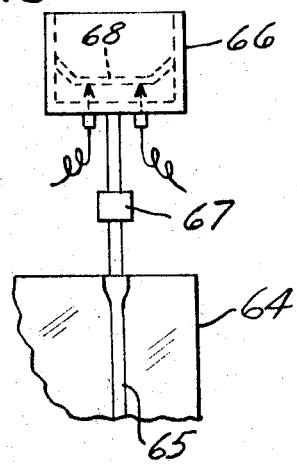
FIG. 16 is a detailed elevation view of another form of the invention.

FIGS. 18 and 19 illustrate a form of the invention wherein a panel 77 has the laminae 78 and 79 in confronting relation with each other and heat sealed together to define an interior, broad and flat vein portion of chamber 80 filled with a conducting fluid such as mercury or the silicone fluid previously described. The panel 77 is provided with tubular conductors 81 cooperating with the fluid 80 in forming an electric circuit which will be interrupted in the event of rupture of the panel 77. It will be noted that this form of the invention is very similar to that illustrated in FIGS. 3 and 10 which the exception that the panel has no discrete veins of a minute nature.

It will be seen that I have provided a safety panel for transmission of infrared rays and other radiation of a gas fired radiant heater such that a rupture or other material deformation in the panel produces an indication in the form of a pressure drop which may result in an electrical circuit discontinuity in order to produce a desired function of shutting off the gas supply to the heater.

It will be understood that in other instances the panel might be constructed of rigid material and the veins may be originally molded therein so that in the event of a breakage of the rigid panel, fluid pressure in the veins would be relieved so as to produce a pressure change which may be sensed and thereby produce an indication.

It will, of course, be understood that various changes may be made in the form, details, arrangement and proportions of the various parts without departing from the scope of my invention.

I claim:

1. A protective panel to isolate an infrared radiator from the space being heated and to produce an indication of a rupture occurring therein,
   comprising a thin panel constructed of rupturable material which is highly transmissive to infrared radiation,
   said panel having vein means formed therein and traversing areas of the panel subject to rupture,
   and a fluid within said vein means and having a pressure subject to being sensed, whereby rupture of the panel across one of said vein portions causes a change in the fluid pressure as an indication of the rupture.

2. The panel according to claim 1 and including a pair of rigid conductors embedded in said panel each of said conductors having one end within the vein means and in conducting relation with the fluid therein, said fluid including a fluid conductor providing electrical continuity between said rigid conductors, and said vein means including a length of vein through which all electrical current flows between said rigid conductors.

3. The panel according to claim 1 wherein said vein means includes a plurality of interconnecting vein portions arranged in a grid work.

4. The panel according to claim 1 wherein said vein means include interconnecting vein portions shunting each other.

5. The panel according to claim 2 wherein said fluid includes a fluid pressure medium maintaining fluid pressure on said fluid conductor to confine the fluid conductor in predetermined position within said vein means.

6. The panel according to claim 2 wherein said vein means includes a relatively large vein portion extending between said rigid conductors and containing a substantial quantity of fluid conductor to provide a low resistance path between said rigid conductors, and said vein means also including a plurality of minute vein portions traversing areas of the panel subject to deformation and permitting flow of the fluid when the panel is ruptured.

7. The panel according to claim 1 and including a pair of rigid conductors embedded in said panel, each of said conductors having one end within the vein means and in conducting relation with the fluid therein, one of said conductors being disposed in spaced relation above the bottom of said fluid whereby release of the pressure on the fluid produces flow by gravity away from said last mentioned rigid conductor.

8. The panel according to claim 1 and said vein means including a broad and thin chamber filled with fluid transmissive of infrared radiation and effecting a change in pressure in the fluid in response to material deformation of the panel.

9. A panel having electrical characteristics, comprising a pair of face to face, insulating panel laminae heat sealed together at a weld zone between the confronting faces, said faces being spaced apart along confined areas to define a vein in the panel,
   an electrically conductive fluid in the vein, and
   a wire mesh conductor heat sealed between and into said laminae, said conductor having an immersed portion extending into and electrically connected to said fluid and also having a terminal portion protruding outwardly beyond said laminae.

References Cited

UNITED STATES PATENTS

| | | |
|---|---|---|
| 2,195,199 | 3/1940 | Becker. |
| 2,624,569 | 1/1953 | Peterson _____ 200—81.6 |
| 3,177,327 | 4/1965 | Weiss. |

H. O. JONES, Primary Examiner